May 21, 1968 R. J. HORTON ET AL 3,384,393
CONDUIT CONNECTOR FOR JUNCTION BOXES
Filed April 19, 1965 3 Sheets-Sheet 3

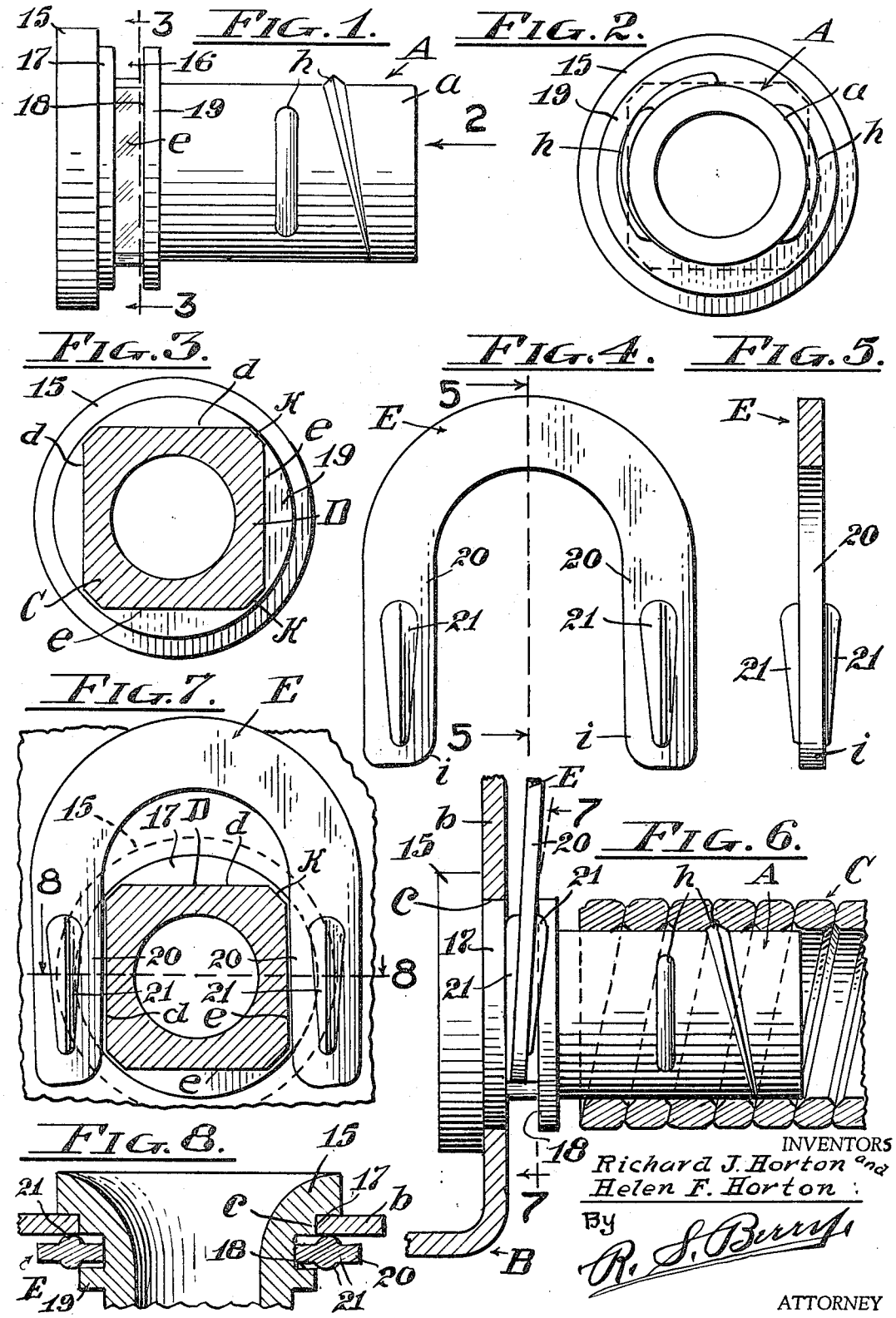

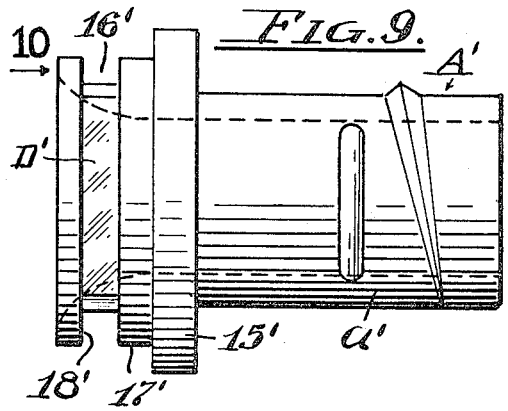
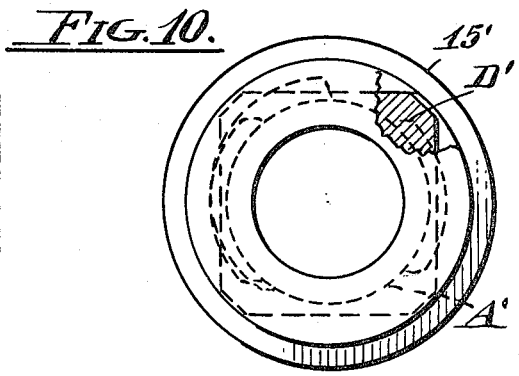
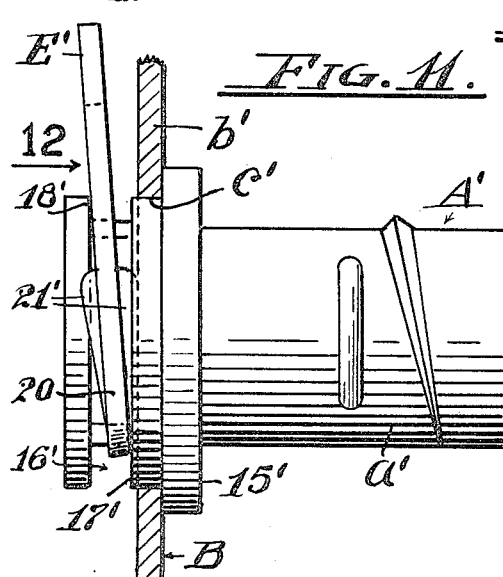
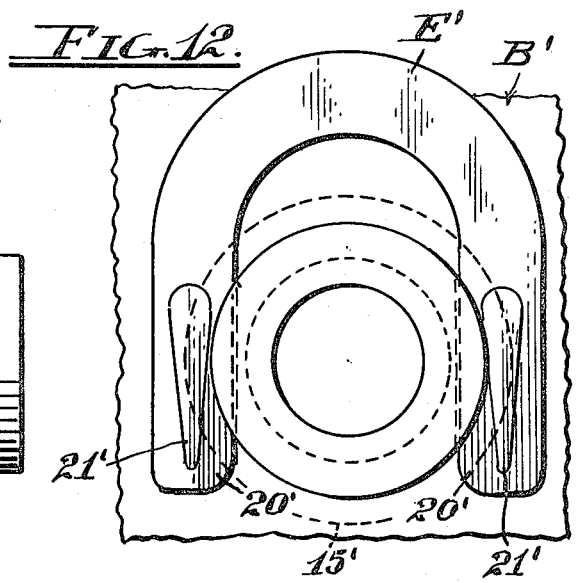
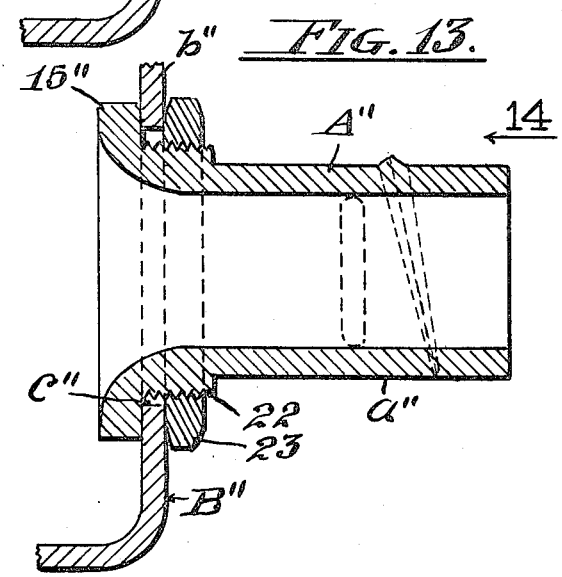
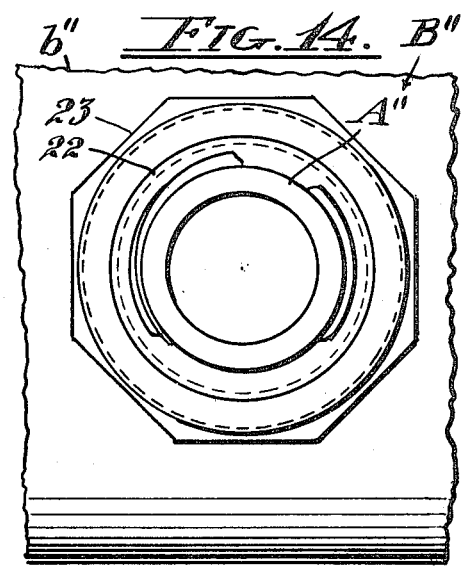

United States Patent Office 3,384,393
Patented May 21, 1968

3,384,393
CONDUIT CONNECTOR FOR JUNCTION BOXES
Richard J. Horton and Helen F. Horton, Burns, Oreg., assignors to Myers Electric Products, Inc., Montebello, Calif., a corporation of California
Filed Apr. 19, 1965, Ser. No. 449,149
1 Claim. (Cl. 285—158)

ABSTRACT OF THE DISCLOSURE

The invention generally considered comprises the combination with a junction box embodying a wall, having a circular opening therein, of an open ended tubular connector having an end portion inserted through said aperture from the interior of said box and adapted to be interposed between the sheathing of an electric cable and electrical conductors therein with a circumferential flange on the inner end of the tubular connection abutting the inner side of the junction box, and wherein the tubular connector is detachably connected to the junction box wall by a yoke shaped wedge interposed between the outer face of the box wall and a pair of flanges on the tubular connector.

SUMMARY OF THE INVENTION

In electrical wiring systems it is common practice to enclose insulated conductors usually in pairs within a flexible sheath composed of spirally wound interconnected metallic strips which structure is generally referred to as an electric cable which is commonly strung throughout the interior of walls, above ceilings and beneath floors of buildings with branches leading here and there. Such branches commonly lead from outlet or junction boxes with the walls of which the cables are connected and wherein the electrical conductors are united with the conductors of branch cables leading from such box. Numerous patents have been issued on structures employed in connecting the electric cables to the junction box of which the following patents are examples:

Patent No. 1,644,298 issued Oct. 4, 1927 to J. C. Ledbetter; Patent No. 1,750,257 issued Mar. 11, 1930 to W. A. Bonnell; Patent No. 2,475,322 issued July 5, 1949 to R. J. Horton et al., applicants herein.

The primary object of the invention is to simplify the detachable connection between the connector and junction box whereby its application and removal will be facilitated in that these operations may be more easily and quickly effected than with constructions now generally in use.

Another object is to provide a connector of the above character which will occupy less space interiorly of the box than present day couplings thus increasing the available working capacity of standard junction boxes when applied.

Another object is to provide a construction whereby the connector may be produced for clamping engagement with a junction box from either the interior or exterior thereof.

A further object is to provide a connector embodying a wedge element which is applied and removed laterally of the connector instead of longitudinally thereof as now generally practiced, and wherein such operations are effected close to the surface of the box so that they may be readily accomplished where space adjacent the box is limited or restricted.

With the foregoing objects and advantages in view together with such other objects and advantages as may subsequently appear, the invention is carried into effect as hereinafter described and claimed and illustrated in the accompanying drawings, in which:

FIG. 1 is a side view of the tubular connector body showing the preferred construction thereof wherein the connector coupling is applied from the inside of a junction box and secured in place from the exterior thereof;

FIG. 2 is an end view as seen in the direction of the arrow 2 in FIG. 1;

FIG. 3 is a view in cross section as seen on the line 3—3 of FIG. 1 in the direction indicated by the arrows;

FIG. 4 is a view in front elevation of a yoke shaped wedge element employed in mounting the connector on a junction box;

FIG. 5 is a view is section and elevation as seen on the line 5—5 of FIG. 4;

FIG. 6 is a view in section and side elevation with parts broken away, showing the connector as applied;

FIG. 7 is a view in section and elevation as seen on the line 7—7 of FIG. 6 in the direction indicated by the arrows;

FIG. 8 is a fragmentary detail in horizontal section taken on the line 8—8 of FIG. 7;

FIG. 9 is a side view of a modified form of the connector body showing it as adapted to be applied to a junction box from the exterior thereof and to be secured in place from the interior of the box;

FIG. 10 is a view in end elevation as seen in the direction of the arrow 10 in FIG. 9 with a portion broken away;

FIG. 11 is a view in side elevation showing the connector of FIGS. 9 and 10 as applied to a junction box;

FIG. 12 is a view in elevation as seen in the direction of the arrow 12 in FIG. 11;

FIG. 13 is a view in longitudinal section depicting another form of the connector showing it as applied to a junction box;

FIG. 14 is a view in elevation as seen in the direction of the arrow 14 in FIG. 13.

Figure 15:
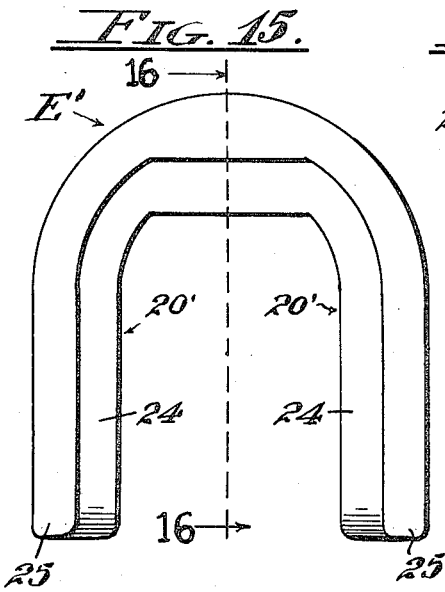
FIG. 15 is a view in elevation of one side of a modified form of the yoke shaped wedge element as constructed to adapt it for use in attaching the connector body to junction boxes of different wall thicknesses.

Referring to FIGS. 1-8 of the drawings, depicting the preferred form of the invention, A indicates generally the connector body which comprises a metallic tube having a cylindrical conduit receiving portion $a$ constituting one end thereof and having a peripheral flange 15 on its other end. A circumferentially extending channel 16 is provided on the body A adjacent to and paralleling the flange 15 one side of which channel consists of an annular wall 17 formed integral with the flange 15. The wall 17 has a thickness substantially corresponding to the thickness of the walls $b$ of a junction-box B to which the connector is to be applied as shown in FIG. 6, and has a diameter slightly less than the diameter of the circular aperture $c$ in the wall $b$ in which the connector is mounted, whereby, when the connector is applied to the box B the wall 17 will extend into the aperture with its periphery substantially conforming to that of the aperture c so as to seat on the margin of the wall b encompassing the aperture.

The other side wall of the channel 16 comprises a circumferentially extending shoulder 18 here shown as formed by a flange 19 on the connector body, which flange and shoulder parallels the wall 17 in spaced relation thereto.

A pair of parallel flat faces d–e form opposite sides of the connector body extending between the wall 17 and shoulder 18. For convenience two pairs of such faces are preferably provided with one pair extending in right angular relation to the other pair, whereby the portion D of the body A extending between the wall 17 and shoulder 18 forming the bottom of the channel 16 is rectangular, as shown in FIG. 3.

The outer end portion a of the body A is designed to be inserted in the end of a flexible electrical conduit C of the spirally wound tube type designed to encompass a pair of electrical conductors (not shown) which conductors are extended from the conduit through the connector into the junction box; the body A having external circumferentially extending ribs h securely engageable with the conduit C in a usual manner.

Means are provided for effecting wedge engagement between the connector and junction box here shown as comprising a yoke E embodying a pair of connected legs 20—20 having parallel inner margins spaced apart a distance substantially corresponding to the distance between the opposed flat sides d–e of the rectangular portion D of the connector astride of which the yoke E is positionable; the legs 20—20 having a thickness less than the width of the channel 16 such as to permit insertion of the legs between the wall 17 and shoulder 18.

Formed on the opposite side faces of each of the legs 20—20 is a protruding rib 21 which extends longitudinally of the leg and is tapered lengthwise; the rib 21 diverging outwardly from its outer end adjacent the free end of the leg to the inner end of the rib which terminates adjacent the inner end of the leg. The ribs 21 thus formed constitute wedges and impart to each of the legs 20—20 and to the yoke E as a whole the characteristics of a wedge whereby when the yoke is applied to the connector, as shown in FIGS. 6–7 and 8, the connector will be securely held in place on the junction box B.

In order for the yoke E to perform its wedging action between the connector and the junction box, the ribs 21 on the legs 20—20 which are semi-circular in cross section, are spaced apart at their longitudinal centers, a distance exceeding the distance between the wall 17 and the shoulder 18 on the flange 19 so that the ribs 21 on the side of the yoke presented to the junction box, will span the wall 17 and bear upon the face of the wall b adjacent the margin of the aperture c, as shown in FIG. 8, and whereby the ribs 21 on the outer side of the yoke will span the flange 19 so that the outer faces of the inner marginal portions of the legs 20—20, when positioned astride the connector, will abut the shoulder 18 at the inner margin of the rib 19, as shown in FIG. 6. When applied, the yoke E will extend in slightly angular relation to the wall b.

As a means for facilitating application of the yoke E, the inner corners of the legs 20—20 are rounded as indicated at i in FIGS. 4–5 and the corners of the rectangular portion D of the connector are beveled as indicated at k in FIGS. 3 and 7.

In the application of the connector above described, the cylindrical outer end portion a thereof is initially passed through an aperture c in the wall b of the junction box B from the interior of the box; the connector being passed through the aperture c until the end flange 15 abuts the inner face of the wall b with the wall 17 seated in the aperture with the side thereof bordering the channel 16 extending substantially flush with the outer face of the wall b. The rectangular portion D of the connector will then protect from the outer face of the wall b and the shoulder 18 will be outwardly spaced relative to such wall.

The yoke E is then applied by positioning the legs 20—20 thereof astride the connector portion D with the inner margins of the legs overlying a pair of the opposed flat faces d–e, as shown in FIG. 7; the outer ends of the legs 20—20 being inserted in the channel 16 and the yoke then advanced with the outer faces of the legs 20—20 presented to the margin of the shoulder 18 and with the ribs 21 on the inner faces of the legs presented to the outer face of the wall b of the junction box. The yoke E is thus advanced until the tapered ribs 21 on the inner side of the yoke act as wedges in co-operation with the shoulder 18 then abutted by the outer side of the yoke, to force the connector outward and tightly clamp and hold the flange 15 against the inner face of the wall b.

The connector A will then be securely fastened to the junction box B, whereupon the conduit C is applied to the connector as shown in FIG. 6.

When the yoke E is tightly wedged between the junction box and the shoulder 18 of the connector the yoke will be firmly held against lateral turning movement relative to the junction box by the frictional engagement of the elongate ribs 21 with the adjacent surface of the wall b. The flat faces d–e of the rectangular portion D of the connector will then co-act with the legs 20—20 of the yoke E to hold the connector against turning relative to the junction box.

It will be observed that the ribs on the outer face of the yoke E serve no purpose when the yoke is applied; the ribs being applied to both sides of the yoke as a matter of convenience, since such arrangement permits application of the yoke either side to and obviates having to manipulate the yoke to determine which side bears the ribs.

The connector may be disconnected from the junction box by withdrawing the yoke E out of engagement with the connector and then withdrawing the connector from the aperture c. This operation will obviously involve removing the conduit C and disconnecting the electrical conductors contained therein from their connections in the box.

In the form of the connector shown in FIGS. 9–12 the tubular connector body A' has a cylindrical portion a' at one end thereof, and a rectangular portion D' at the other end thereof with such portions separated by a circumferential cylindrical flange 15', and with the end portion D' lying between a wall 17' and shoulder 18' and forming the bottom of a channel 16' bordered by said wall and flange. The connector thus formed is applied to a junction box B' by inserting the end portion D' through the aperture c' in the wall b' of the box B' from the exterior thereof, so as to abut the flange 15' against the outer side of the wall b' with the flange 17' seated in the aperture c' and with the channel 16', portion D' and shoulder 18' on the flange 19' extending from the inner face of the wall b' into the interior of the junction box.

The yoke E' is applied astride the end portion D' and act to clamp the flange 15' against the outer face of the junction box in the manner before described, whereby the connector is securely held in place; the yoke E' bearing wedging ribs 21' on the legs 20' thereof as described relative to the construction shown in FIGS. 1–8 and functioning in like fashion.

By adapting the connector for application to the junction box from the exterior thereof as above described, the conduit may be applied to the connector either before or after mounting of the connector on the box.

Another mode of fastening the connector on the junction box where the connector is applied from the interior thereof and secured in place from the exterior thereof, is illustrated in FIGS. 13–14, wherein the tubular connector body A" is cylindrical throughout and has a circumferentially extending flange 15" on an end thereof for seating on the inner side of the wall b" of the junction box B". In this instance the connector body is provided with an externally threaded portion 22 extending from the inner face of the flange 15" which portion projects through the aperture c" when the connector is applied and projects a short distance outwardly from the exterior of the wall b".

A nut 23 is screwed on the threaded portion 22 after the conduit receiving end a" of a connector body has been passed through the aperture c" from the inner side of the wall b" and the threaded portion 22 projected from the outer side of the wall b", as shown in FIG. 13; the nut 23 being tightened on the threaded portion 22 to bear against the outer face of the wall b" so as to tightly abut the flange 15" against the inner side of the wall b". The connector will thus be securely fastened to the junction box whereupon the conduit is applied to the connector in the usual manner.

Figure 16:
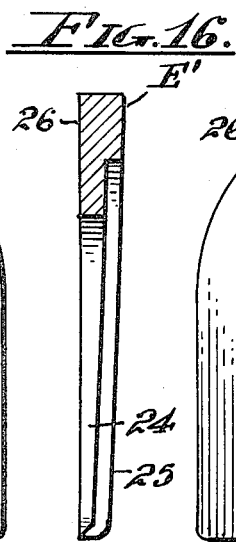
FIG. 16 is a view in section and elevation as seen on the line 16—16 of FIG. 15.
Figure 17:
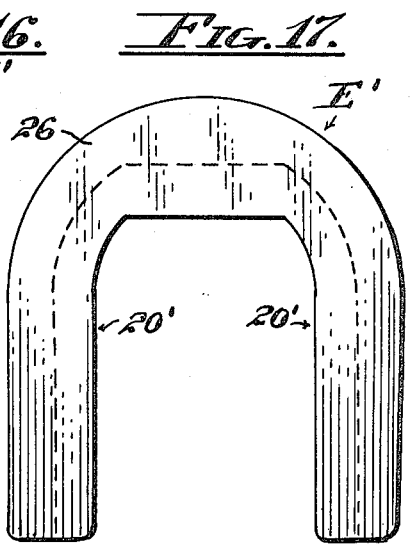
FIG. 17 is an elevational view showing the side of the wedge element opposite that shown in FIG. 15.

The modified form of the yoke shaped wedge element E', shown in FIGS. 15–17 and depicted as applied in FIGS. 18–21, is adapted for use in attaching connectors A to junction box walls of different thicknesses.

Figure 18:
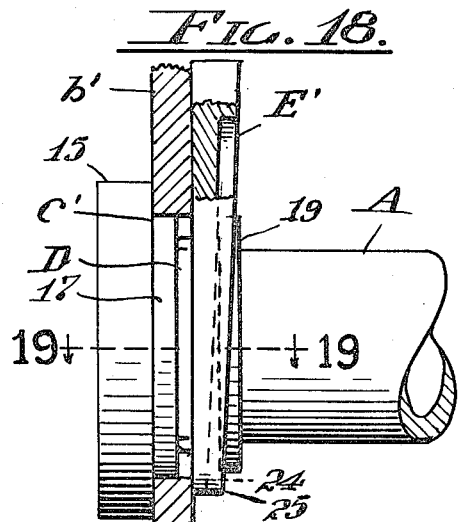
FIG. 18 is a view in side elevation with parts broken away showing the wedge element of FIG. 15 as applied in attaching the connector to a junction box having wall of major thickness.
Figure 20:
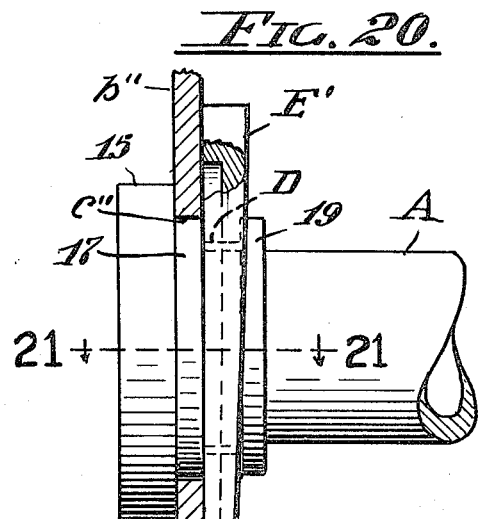
FIG. 20 is a view in side elevation with parts broken away showing the wedge element of FIG. 15 as applied in attaching the connector to a junction box having a wall of minor thickness.
Figure 19:
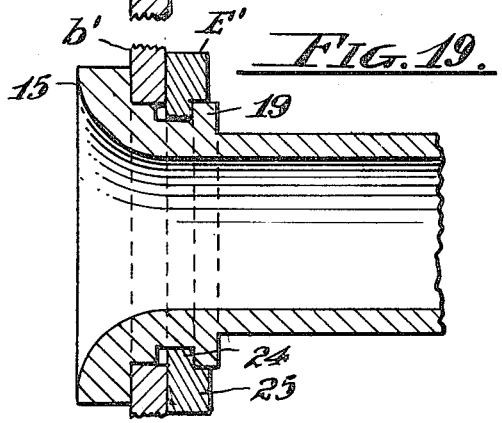
FIG. 19 is a view in section and plan taken on the line 19—19 of FIG. 18.
Figure 21:
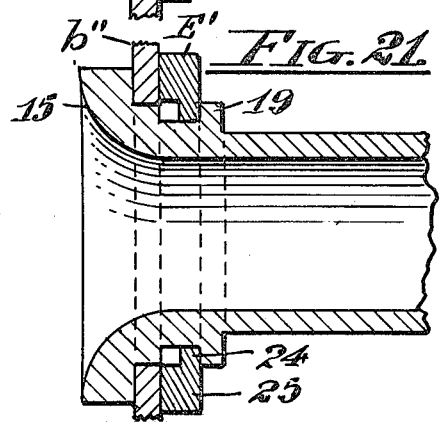
FIG. 21 is a view in section and plan taken on the line 21—21 of FIGURE 20.

On positioning the connector A in the opening c' of the wall b' of the greater thickness as shown in FIGS. 18–19 the distance between the wall b' and flange 19 on the connector will be less than where the connector is positioned in the opening c" in the wall b" of lesser thickness as shown in FIGS. 20–21.

In order to accommodate the wedge element E' for use on junction boxes having different wall thicknesses, the parallel legs 20'—20' of the element which are of substantially uniform width throughout are tapered in the direction of their thickness to converge toward their outer ends with the inner half portion 24 of each leg substantially half the thickness of the outer marginal portion 25 thereof; the inner and outer marginal portions 24–25 of each leg 20' constituting a pair of wedges of different thicknesses arranged side-by-side with their entrant ends aligned. One side 26 of the element E thus formed is flat and coplanar throughout as shown in FIG. 17.

When the connector A is to be applied to a junction box having the greater wall thickness, as shown in FIGS. 18–19, the element E' is positioned astride the rectangular portion D of the connector A with the flat side 26 of the element E seating on the outer face of the wall b' of the junction box and with the inclined outer face of the inner marginal portions 24—24 of the legs 20'—20' bearing against the inner face 18 of the flange 19, as shown in FIG. 19. In this instance the margin of the wall 17 of the connector will be disposed within the aperture c' in spaced relation to the outer surface of the wall b' because of the thickness of the latter.

When the connector A is to be applied to a junction box having the lesser wall thickness, as shown in FIGS. 20–21, the element E' is positioned astride the rectangular portion D of the connector A with the flat side 26 of the element presented away from the junction box so that the inner margins of the legs 20'—20' will then abut the inner face 18 of the flange 19 while the opposite side of the larger wedge portion 25 of the legs 20'—20' will abut the outer side of the junction box wall b" as shown in FIG. 21.

In each of the above applications of the element E, it is forced astride the portion D of the connector so as to exert wedge action between the junction box B and the connector A.

We claim:
1. In a conduit connector for a junction box embodying a wall having inner and outer sides and formed with an annular connector aperture, the combination of
 (a) a cylindrical tubular body A insertable longitudinally through said aperture having an outer end portion telescopically insertable interiorally of a tubular conduit in encompassing relation to electrical conductors, within said conduit and having an external diameter conformable to the interior diameter of the tubular conduit applied thereto;
 (b) a continuous integral end flange 15 on and surrounding said cylindrical tubular body positioned against the inner side of said wall on longitudinally inserting said cylindrical body outwardly through said aperture, said flange constituting the inner end of said tubular body through which said electrical conductors extend;
 (c) a pair of complementary spaced annular flanges on and surrounding said cylindrical body one of which flanges projects from the inner side of said end flange a distance less than the thickness of said wall and slidably conforms to the wall of said aperture while the inner side of the other of said pair of flanges is spaced from the outer side of said wall contiguous thereto when said end flange is seated against the inner side of said wall;
 (d) opposed parallel flat exterior faces on the portion of said cylindrical body extending between said pair of flanges; and
 (e) a non-yieldable yoke-shaped wedge slidably positioned astride said flat faces having opposed relatively inclined front and back faces extending throughout the lengths thereof with one of said faces bearing throughout its length against the outer face of said junction box wall with the other of said faces bearing against the inner side of the outer of said pair of flanges.

References Cited
UNITED STATES PATENTS

| | | | |
|---|---|---|---|
| 431,791 | 7/1890 | Aldrich | 285—421 X |
| 1,644,298 | 10/1927 | Ledbetter | 285—205 |
| 1,750,257 | 3/1930 | Bonnell | 285—205 X |
| 1,875,209 | 8/1932 | Baldwin | 285—205 X |
| 2,284,222 | 5/1942 | Miller | 285—205 X |
| 3,275,347 | 9/1966 | Scott | 285—161 |

EDWARD C. ALLEN, *Primary Examiner.*

THOMAS F. CALLAGHAN, *Examiner.*